J. B. McINTIRE.
PLAYING CARDS.
APPLICATION FILED JAN. 30, 1918.

1,320,899.

Patented Nov. 4, 1919.

INVENTOR

UNITED STATES PATENT OFFICE.

JOHN B. McINTIRE, OF WILKINSBURG, PENNSYLVANIA.

PLAYING-CARDS.

1,320,899.   Specification of Letters Patent.   Patented Nov. 4, 1919.

Application filed January 30, 1918. Serial No. 214,495.

*To all whom it may concern:*

Be it known that I, JOHN B. McINTIRE, a citizen of the United States, and resident of Wilkinsburg, in the county of Allegheny and State of Pennsylvania, have invented a new and useful Improvement in Playing-Cards; and I do hereby declare the following to be a full, clear, and exact description thereof.

My invention relates to playing cards such as used for playing games, and its object is to provide an improved form of playing card carrying advertising reading matter, so that the advertising matter will be before the player to be almost unconsciously read during the playing of the game.

To these ends my invention comprises the novel features hereinafter set forth and claimed.

Figure 1:
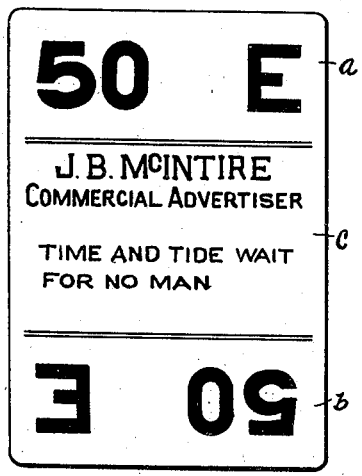
Figure 2:
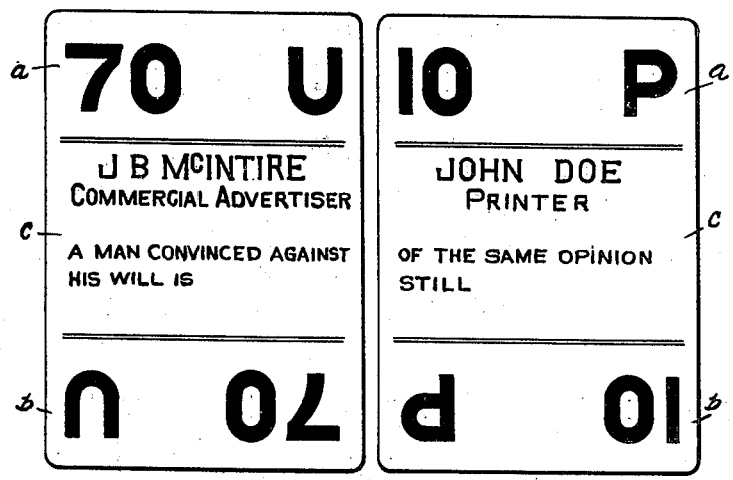

In the accompanying drawing, Figure 1 is a face view of a card embodying my invention; and Fig. 2 and Fig. 3 are face views of a pair of such cards arranged with a portion of the reading matter found on one card and the remaining portion thereof found on another card. The cards are preferably of the conventional playing card form, and formed of paper, celluloid, cardboard or the like, and with square or rounded corners. Each card of the pack has printed on it at each end, suitable playing symbols; for instance, the numeral symbols, which in the card illustrated are shown as 50, 70, 10, and these symbols start from 10 and run up to 100. The cards also illustrate letter symbols such as the letters shown to the right hand of each card. These symbols are placed at each end *a b* of the card, and between the same there is advertising reading matter, so that during the playing of the game, the player will be almost unconsciously reading and learning the advertising matter. I thus take advantage of the mid-portion of the card of ordinary sized playing card to provide for advertising of any particular matter desired, and so utilize the space between the ends of the card for that purpose. For example in the card of Fig. 1, the advertisement is placed in the mid-portion and is entirely complete in that card. However, the advertising matter can be placed on the card, and at the same time this advertising matter or other matter which will attract attention to the card may be carried on two different cards; for example, in the cards in Figs. 2 and 3 there is the advertising matter found on each card, while the sentence "A man convinced against his will, is of the same opinion still," is divided, an incomplete portion of that sentence being placed on one card, while the remainder of the sentence is placed on another card. This may be varied according to the desire of the maker of the cards. It may be used in the form of questions and answers. These may cover a commercial subject for the benefit of the advertiser, or they may cover an educational subject, such as geography, history, mathematics or any other educational subject. The object and purpose is to reduce the subject to concise and specific statements and through the attractiveness and interest of the game, to bring before the mind of the player these facts so insistently and constantly that they become so indelibly fixed that he cannot forget them. The game may be used to very great advantage in our public schools as well as the home. One feature of the game is a story or history of some particular subject, divided into paragraphs, one paragraph being printed on each card, but not in consecutive order. The problem is to put this story together in its proper order. This requires reading and re-reading of the different cards, until the entire story is practically committed.

The cards as so designed, have, of course, the main playing symbols at the ends *a b* in large type, either numerals or letters, or both as desired, and the advertising printed matter in the mid-portion *c* of each card is smaller type, so that a goodly portion of reading matter may be found on each card.

The cards may be printed in different colors. This of course, cannot be illustrated in the drawing, but the cards are printed, for example, in red, blue, green, purple and black, according to the number of cards in any particular series in the pack, and in the playing of the game, each color of card may count as against a card of another color, according to the character of the game to be played.

The cards can be used for playing different games; for example, with the numerals of the cards, the game may be played that one numeral of higher value takes a lower numeral, and that the cards in one line of separate color take the cards of another line of a different color, the colors being utilized to vary the game as desired. The cards may be played to obtain runs or series, both in colors and in amounts. In like nanner, the letter symbols may be used for the spelling of words or any other ordinary use of letters. In the playing of any such games, the advertising reading matter in the mid-portion of the card is always before the eye of the player, and thus a number of different advertisements may be read or examined by him during the playing of the game with the cards. Also one form of the game may provide for the matching of an incomplete sentence found on one card by means of its companion card. The games may be varied this way as desired.

What I claim is:

A pack of playing cards having playing symbols at each end and reading matter in the mid-portion of the card which is made up of reading matter incomplete on one card, and completed on another card.

In testimony whereof, I, the said JOHN B. McINTIRE, have hereunto set my hand.

JOHN B. McINTIRE.

Witnesses:
 JOHN F. WILL,
 EDWARD POXEMSKI.

Copies of this patent may be obtained for five cents each, by addressing the "Commissioner of Patents, Washington, D. C."